(12) United States Patent
Kim

(10) Patent No.: US 6,581,023 B1
(45) Date of Patent: Jun. 17, 2003

(54) ACCURATE CONTACT CRITICAL DIMENSION MEASUREMENT USING VARIABLE THRESHOLD METHOD

(75) Inventor: Hung-Eil Kim, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 53 days.

(21) Appl. No.: 09/778,529

(22) Filed: Feb. 7, 2001

(51) Int. Cl.[7] .............................................. G06F 15/00
(52) U.S. Cl. ....................... 702/155; 702/150; 702/155; 382/145
(58) Field of Search ................................. 702/150, 155, 702/157, 158, 166, 170; 356/400, 401, 501–503; 382/100, 144–145, 152

(56) References Cited

U.S. PATENT DOCUMENTS

| | | | | |
|---|---|---|---|---|
| 5,969,273 A | * | 10/1999 | Archie et al. ................ | 356/501 |
| 6,178,256 B1 | * | 1/2001 | Nguyen et al. .............. | 382/144 |
| 6,185,323 B1 | * | 2/2001 | Archie et al. ................ | 382/145 |
| 6,208,747 B1 | * | 3/2001 | Nguyen et al. .............. | 382/100 |
| 6,277,661 B1 | * | 8/2001 | Yang et al. ................... | 438/14 |

* cited by examiner

Primary Examiner—Bryan Bui
(74) Attorney, Agent, or Firm—Foley & Lardner

(57) ABSTRACT

An embodiment disclosed relates to a variable threshold method of accurately determining a critical dimension (CD) of an integrated circuit feature. This method can include applying a scanning electron microscope (SEM) to an aperture in a layer of material in a portion of an integrated circuit, obtaining a first measurement of a critical dimension of the aperture, applying the SEM again to the aperture, obtaining a second measurement of the critical dimension of the aperture; and determining a depth of focus margin using the first measurement and the second measurement.

20 Claims, 5 Drawing Sheets

ACCURATE CONTACT CRITICAL DIMENSION MEASUREMENT USING VARIABLE THRESHOLD METHOD

FIELD OF THE INVENTION

The present specification is related to integrated circuit (IC) fabrication. More specifically, the present specification is related to measuring the critical dimension (CD) of an integrated circuit feature using a variable threshold process.

BACKGROUND OF THE INVENTION

Semiconductor devices or integrated circuits (ICs) can include millions of devices, such as, transistors. Ultra-large scale integrated (ULSI) circuits can include complementary metal oxide semiconductor (CMOS) field effect transistors (FET). Despite the ability of conventional systems and processes to put millions of devices on an IC, there is still a need to decrease the size of IC device features, and, thus, increase the number of devices on an IC.

One limitation to the smallness of IC critical dimensions is conventional lithography. In general, projection lithography refers to processes for pattern transfer between various media. According to conventional projection lithography, a silicon slice, the wafer, is coated uniformly with a radiation-sensitive film or coating, the photoresist. An exposing source of radiation (such as light, x-rays, or an electron beam) illuminates selected areas of the surface through an intervening master template, the mask, for a particular pattern. The lithographic coating is generally a radiation-sensitized coating suitable for receiving a projected image of the subject pattern. Once the image is projected, it is indelibly formed in the coating. The projected image may be either a negative or a positive image of the subject pattern.

Exposure of the coating through a photomask or reticle causes the image area to become selectively crosslinked and consequently either more or less soluble (depending on the coating) in a particular solvent developer. The more soluble (i.e., uncrosslinked) or deprotected areas are removed in the developing process to leave the pattern image in the coating as less soluble polymer.

Projection lithography is a powerful and essential tool for microelectronics processing. As feature sizes are driven smaller and smaller, optical systems are approaching their limits caused by the wavelengths of the optical radiation.

One alternative to projection lithography is EUV lithography. EUV lithography reduces feature size of circuit elements by lithographically imaging them with radiation of a shorter wavelength. "Long" or "soft" x-rays (a.k.a., extreme ultraviolet (EUV)), wavelength range of lambda=50 to 700 angstroms are used in an effort to achieve smaller desired feature sizes.

In EUV lithography, EUV radiation can be projected onto a resonant-reflective reticle. The resonant-reflective reticle reflects a substantial portion of the EUV radiation which carries an IC pattern formed on the reticle to an all resonant-reflective imaging system (e.g., series of high precision mirrors). A demagnified image of the reticle pattern is projected onto a resist coated wafer. The entire reticle pattern is exposed onto the wafer by synchronously scanning the mask and the wafer (i.e., a step-and-scan exposure).

Although EUV lithography provides substantial advantages with respect to achieving high resolution patterning, errors may still result from the EUV lithography process. For instance, the reflective reticle employed in the EUV lithographic process is not completely reflective and consequently will absorb some of the EUV radiation. The absorbed EUV radiation results in heating of the reticle. As the reticle increases in temperature, mechanical distortion of the reticle may result due to thermal expansion of the reticle.

Both conventional projection and EUV lithographic processes are limited in their ability to print small features, such as, contacts, trenches, polysilicon lines or gate structures. As such, the critical dimensions of IC device features, and, thus, IC devices, are limited in how small they can be.

Critical dimensions can be measured using a scanning electron microscope (SEM). Measurements of critical dimensions of integrated circuit features can be inaccurate due to limitations of the SEM. For example, a measurement of the critical dimension at the bottom of a trench formed for a contact can measure larger than actual by the SEM at defocus conditions. Inaccurate measurements such as this make accurate depth of focus margins difficult because true values are not known.

Thus, there is a need for a process of measuring critical dimensions of integrated circuit features which is more accurate. Further, there is a need for a method of correctly identifying the width of a contact hole. Yet further, there is a need for a method of determining depth of focus margins more accurately. Even further still, there is a need for a system for measuring critical dimensions of integrated circuit features more accurately than a conventional SEM measurement.

SUMMARY OF THE INVENTION

An embodiment is related to a method of measuring the critical dimension of an integrated circuit feature using a variable threshold process. This method can include obtaining a first slope measurement of lateral side walls of an integrated circuit feature at best focus conditions, obtaining a second slope measurement of lateral side walls of the integrated circuit feature at defocus conditions, and calculating a critical dimension of the integrated circuit feature from the first slope measurement and the second slope measurement.

Another embodiment is related to a method of using a scanning electron microscope to measure a critical dimension of an integrated circuit feature. This method can include determining a slope α of a contact hole at best focus conditions, determining a slope β of the contact hole at defocus conditions, and, using the slope α and the slope β, determining a critical dimension (CD) at a bottom of an integrated circuit feature.

Another embodiment is related to a variable threshold method of accurately determining a critical dimension (CD) of an integrated circuit feature. This method can include applying a scanning electron microscope (SEM) to an aperture in a layer of material in a portion of an integrated circuit, obtaining a first measurement of a critical dimension of the aperture, applying the SEM again to the aperture, obtaining a second measurement of the critical dimension of the aperture; and determining a depth of focus margin using the first measurement and the second measurement.

Other principle features and advantages of the present invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals denote like elements, and.

DETAILED DESCRIPTION OF EXEMPLARY EMBODIMENTS

During integrated circuit design and fabrication processes, it can be desirous, or even necessary, to measure the critical dimension (CD) at the bottom or close to the bottom of a trench or contact hole. Nevertheless, as mentioned above, a critical dimension scanning electron microscope (CD-SEM) measures the CD larger than the actual CD at defocus conditions. Defocus conditions refers to where the image signal is blurred at the edge of the bottom of the contact. With an inaccurate CD measurement, it is difficult to verify the depth of focus margin with accuracy. Depth of focus margin is important to know because it is one of the main factors which defines a pattern within some tolerance limits.

Figure 1:
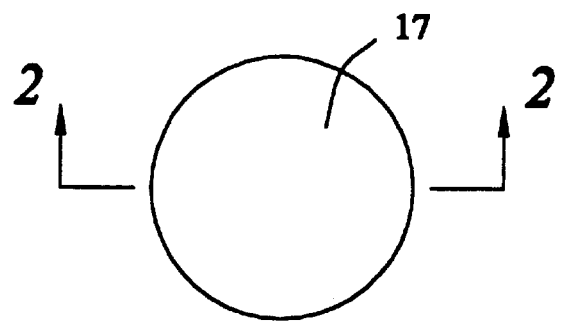
FIG. 1 is a schematic diagram illustrating a top planer view of a contact hole feature and a layer of photoresist.
Figure 2:
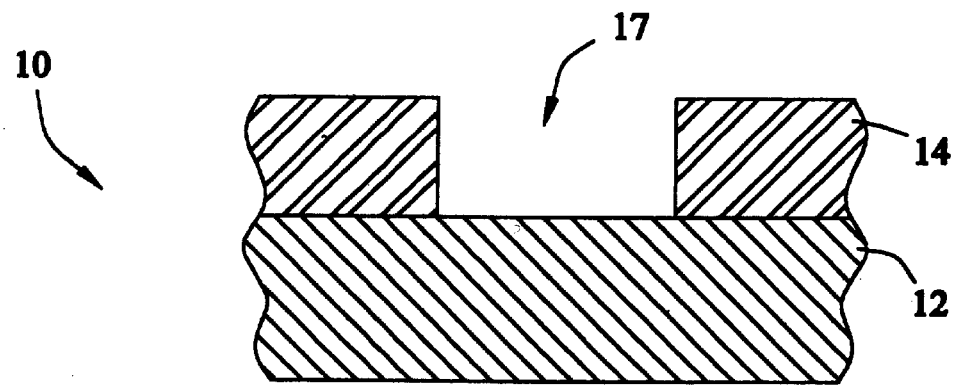
FIG. 2 is a schematic cross-sectional view of a contact hole feature in a layer of photoresist about line 2—2.

Referring now to FIGS. 1 and 2, a portion 10 of an integrated circuit (IC) includes an integrated circuit feature such as a contact hole. Portion 10 can include a substrate 12 and a photoresist layer 14. Substrate 12 can be an entire IC wafer or part of an IC wafer. Substrate 12 can be part of an integrated circuit, such as, a memory, a processing unit, an input/output device, etc.

Photoresist layer 14 is disposed over substrate 12 and can be any of a variety of materials which provide photoreflective qualities. In alternative embodiments, photoresist layer 14 is disposed over insulative, conductive, or any of a variety of single or multiple layers of materials. Photoresist layer 14 includes an aperture 17 (e.g., a contact hole) which exposes a portion of substrate 12. In an exemplary embodiment, aperture 17 has a critical dimension below 0.16 µm.

Figure 3:
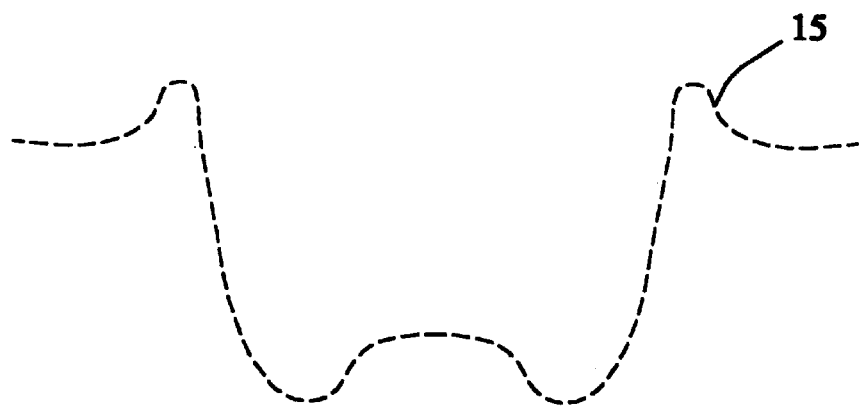
FIG. 3 is a schematic drawing of a scanning electron microscope signal associated with a contact hole feature in a layer of photoresist illustrated in FIGS. 1 and 2 under best focus conditions.

Referring to FIG. 3, CD-SEM signal 15 illustrates an exemplary signal received by a scanning electron microscope when applied to portion 10. CD-SEM signal 15 results when the scanning electron microscope is applied using best focus conditions. Best focus conditions refers to the condition where the SEM signal has a very sharp edge at the top and bottom portions of the signal corresponding to the top and bottom of aperture 17 described with reference to FIG. 2.

Figure 4:
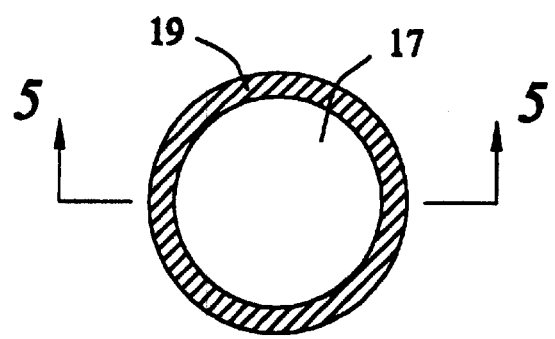
FIG. 4 is a schematic diagram illustrating a top planer view of a contact hole feature in a layer of photoresist.
Figure 5:
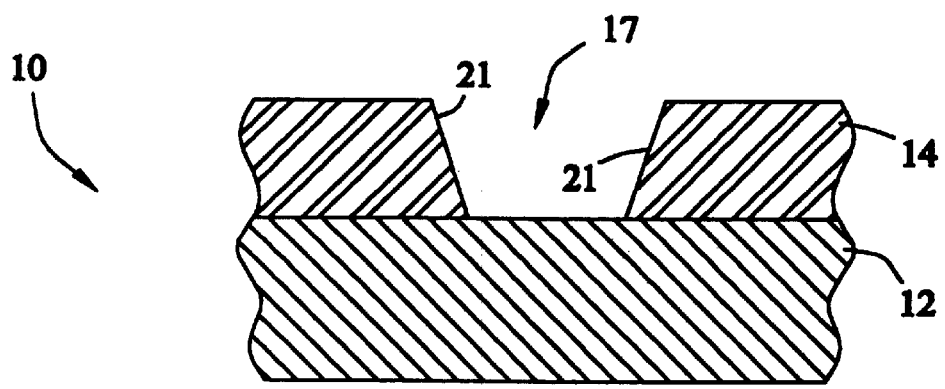
FIG. 5 is a schematic cross-sectional view of a contact hole feature in a layer of photoresist about line 5—5.
Figure 6:
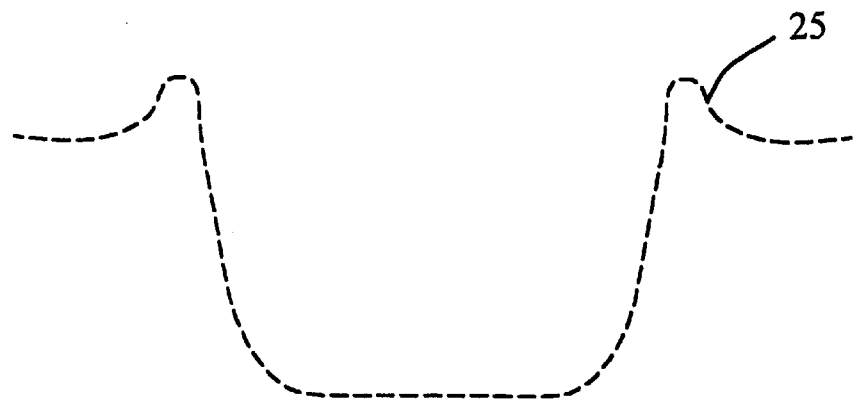
FIG. 6 is a schematic drawing of a scanning electron microscope signal associated with the contact hole feature in a layer of photoresist illustrated in FIGS. 4 and 5 under defocus conditions.

FIGS. 4 and 5 illustrate portion 10 as viewed by a SEM at defocus conditions. Circumference 19 (FIG. 4) is less ascertainable and lateral side walls 21 (FIG. 5) appear sloped when viewed by a SEM at defocus conditions. Referring to FIG. 6, CD-SEM signal 25 illustrates an exemplary signal received by a scanning electron microscope when applied to portion 10. CD-SEM signal 25 results when the scanning electron microscope is applied using defocus conditions. Defocus conditions refers to the condition where the SEM signal is not sharp at the top and bottom edges of the portion of the signal corresponding to aperture 17 described with reference to FIG. 2. Further, the area at the bottom portion of the signal is small.

Figure 7:
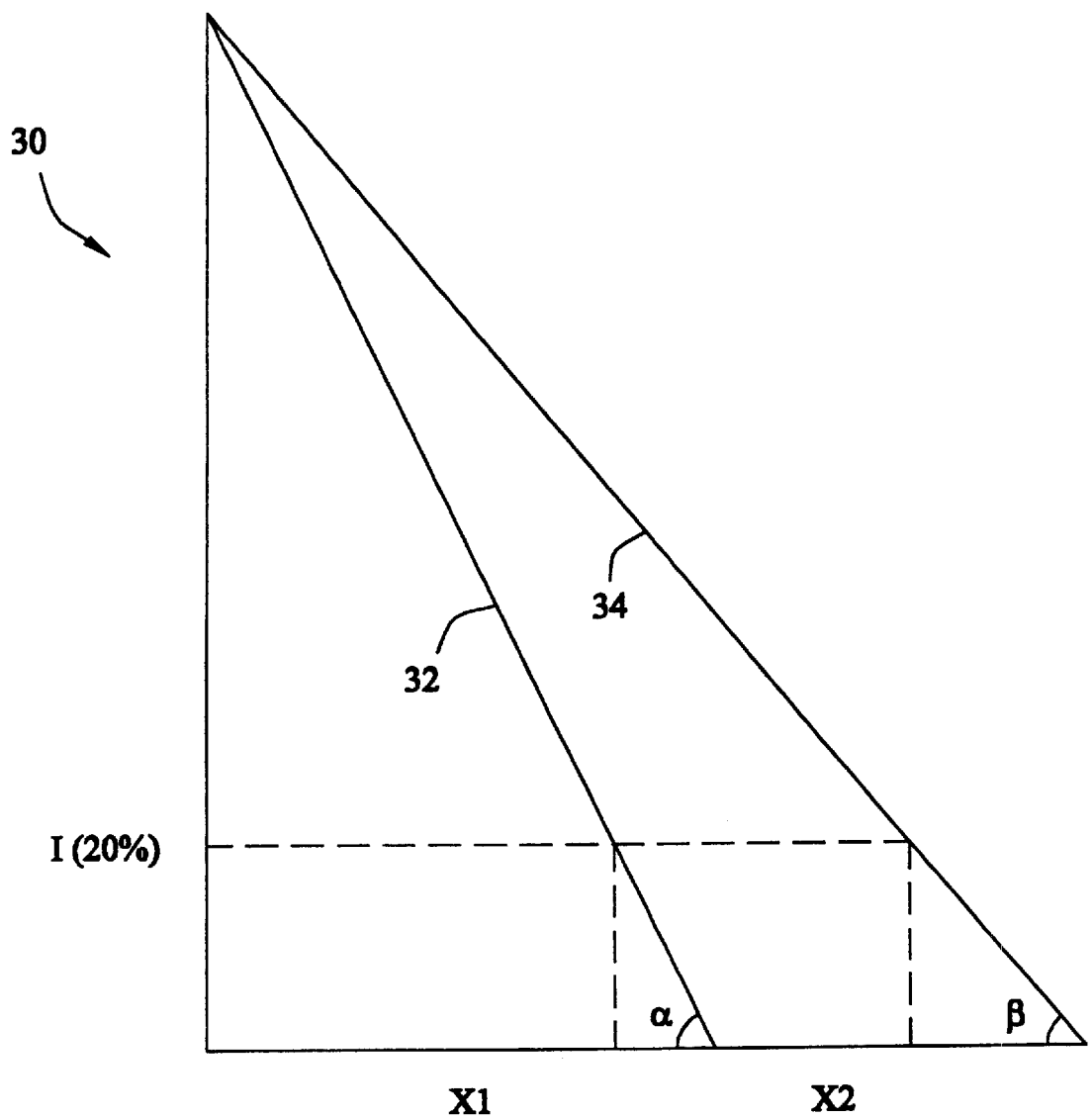
FIG. 7 is a graphical representation of the slope of a portion of e-beam signals from a scanning electron microscope used at best focus conditions and at defocus conditions.

FIG. 7 illustrates a graph 30 depicting one half of CD-SEM signal 15 and one half of CD-SEM signal 25 representing one side of lateral side walls of aperture 17 (described with reference to FIGS. 1–6). In FIG. 7, portions of CD-SEM signal 15 and CD-SEM signal 25 are superimposed on one another. Graph 30 illustrates a slope 32 of CD-SEM signal 15 at best focus conditions and a slope 34 of CD-SEM signal 25 at defocus conditions. Slope 32 in FIG. 7 can be represented by an angle alpha ($\alpha$) and slope 34 can be represented by an angle beta ($\beta$).

In an exemplary embodiment, a variable threshold method is used to make an accurate determination of the critical dimension (CD) of aperture 17 (described with reference to FIGS. 1–6) and the depth of focus margin. In the CD-SEM, a threshold value can be provided for a default intensity level (e.g., 20%). If the threshold is 20%, for example, the slope of signal can be diagrammed as illustrated in FIG. 7, where slope 32 is larger than slope 34 and these slopes are dependent on the contact size. Even though threshold can be chosen to be 20% at both focus conditions, defocus condition (slope 34) results in a larger critical dimension (CD) because of the larger slope of its signal. A method is described below which does not depend on the chosen threshold or intensity of the SEM. As such, the threshold can be variable without adversely affecting critical dimension (CD) computations.

In an exemplary embodiment, variable threshold method includes determining the angle $\alpha$ at best focus conditions. Then, the angle $\beta$ is determined at defocus condition of wafer. At the defocus condition, the slope of the CD-SEM, or e-beam scan, signal becomes larger. In order to compensate for CD error at defocus (or reduce the CD measurement at defocus conditions), the difference between the CD at defocus ($X_2$) and at focus ($X_1$) conditions is required. As such, $X_2-X_1$, is calculated using the following mathematical relationships:

$$\tan(90-\alpha) = \frac{X_1}{I(20\%)} \quad \& \quad \tan(90-\beta) = \frac{X_2}{I(20\%)}$$

$$\Downarrow \qquad\qquad\qquad \Downarrow$$

$$X_1 = I(20\%)\tan(90-\alpha) \quad I(20\%) = \frac{X_2}{\tan(90-\beta)}$$

$$\therefore X_1 = \frac{\tan(90-\alpha)}{\tan(90-\beta)}X_2$$

$$\therefore X_2 - X_1 = X_1\left(\frac{\tan(90-\beta)}{\tan(90-\alpha)} - 1\right)$$

If both sides of the CD-SEM signal are considered, the total CD reduction from an original CD measurement value is:

$$\text{original CD size} - 2X_1\left[\frac{\tan(90-\beta)}{\tan(90-\alpha)} - 1\right]$$

This equation allows for the determination of the critical dimension (CD) without relation to the intensity (I) of the SEM. As such, the method described herein can improve the CD measurement error at defocus conditions.

Figure 8:
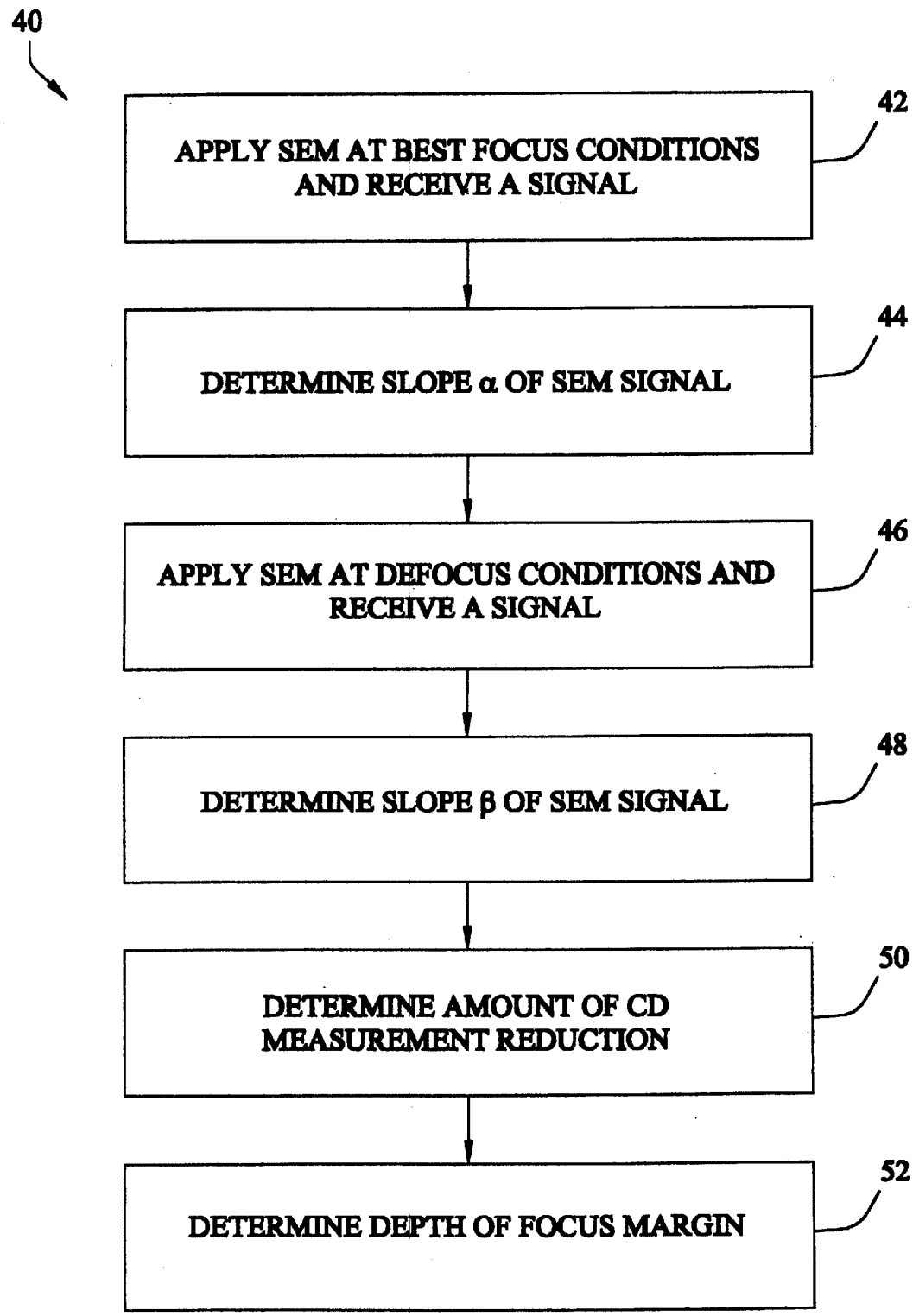
FIG. 8 is a flow diagram of steps in a method of measuring a critical dimension of an integrated circuit feature using a variable threshold process in accordance with an exemplary embodiment.

FIG. 8 illustrates a flow diagram 40 depicting steps in an exemplary method of measuring the critical dimension of an integrated circuit feature using a variable threshold process. In a step 42, a scanning electron microscope (SEM) is applied to portion 10 (described with respect to FIGS. 1–7) at best focus conditions and a signal is received. Best focus conditions refers to where the image signal is very sharp at the edges of the top and bottom of the contact.

In a step 44, a slope α is determined from the signal received by the SEM in step 42. Slope α can be determined in a variety of ways. In an exemplary embodiment, slope α is determined utilizing computational features programmed into the SEM. In other exemplary embodiments, slope α can be determined manually by a integrated circuit designer or technician.

In a step 46, a scanning electron microscope (SEM) is applied to portion 10 (described with respect to FIGS. 1–7) at defocus conditions and a signal is received. Defocus conditions refers to where the image signal is blurred at the edge of the bottom of the contact because there is a larger slope between the top and the bottom of the contact pattern.

In a step 48, a slope β is determined from the signal received by the SEM in step 46. Slope β can be determined in a variety of ways. In an exemplary embodiment, slope β is determined utilizing computational features programmed into the SEM. In other exemplary embodiments, slope β can be determined manually by a integrated circuit designer or technician.

In a step 50, the amount of CD measurement reduction is determined. In an exemplary embodiment, this determination is made by the integrated circuit designer or technician. In other exemplary embodiments, this calculation is programmed into a specialized machine, such as, a SEM or Microsoft WINDOWS, UNIX, or any other suitable software platform. The amount of CD measurement reduction can be used to improve the CD measurement error at defocus conditions. This can be important because it is possible to check the true depth of the focus margin for certain photo processes.

In a step 52, the depth of focus margin is determined. In an exemplary embodiment, this determination is made by the integrated circuit designer or technician. In other exemplary embodiments, this calculation is programmed into a specialized machine, such as, a SEM or Microsoft WINDOWS, UNIX, or any other suitable software platform. The depth of focus margin is important because it allows the integrated circuit designer to know a variety of characteristics of the integrated circuit design. For example, the depth of focus margin indicates how thick layers can be and how small features can be patterned. Generally, integrated circuit designers want the applied light or radiation to reach through entire layers on the IC wafer. If the depth of focus was too shallow for a given layer, it would be impossible to properly pattern features.

Figure 9:
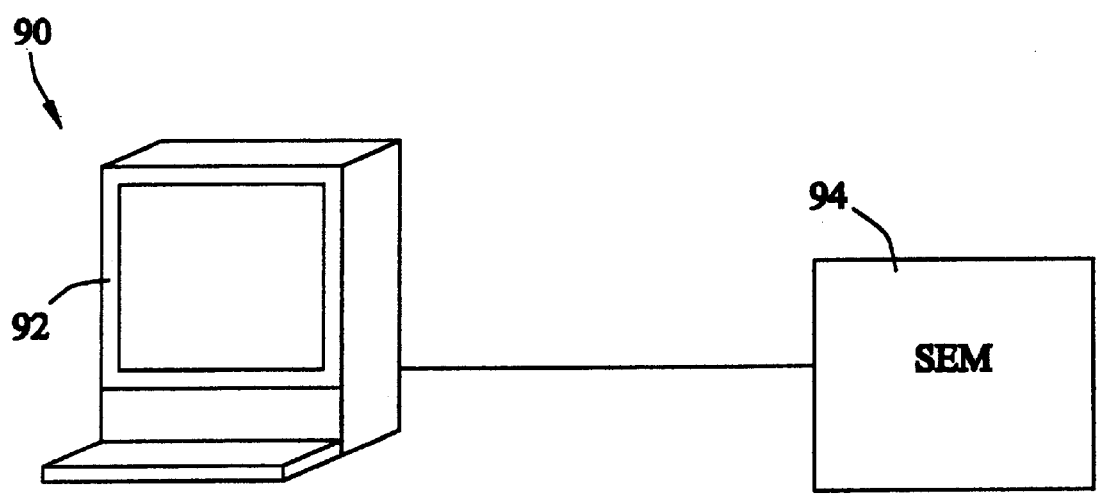
FIG. 9 is a block diagram of an exemplary system for implementing a method of measuring a critical dimension of an integrated circuit feature in accordance with an exemplary embodiment.

Referring now to FIG. 9, a system 90 includes a computer or workstation 92 coupled with a scanning electron microscope (SEM) 94. In an alternative embodiment, computer 92 is integrated within SEM 94. Computer 92 can be used for calculations of slope 32 and slope 34 described with reference to FIG. 7. Further, computer 92 can be used to calculate a depth of focus margin for a wafer under examination by SEM 94.

Computer 92 can be running any of a variety of operating systems, such as, Microsoft WINDOWS, UNIX, or any other suitable software platform. Computer 92 can be configured to display signals received from SEM 94 as well as make calculations from scanning electron microscope beta. In an alternative embodiment, computer 92 is coupled with SEM 94 via a network which allows computer 92 to be in any location, either remote or approximate to SEM 94.

While the embodiments illustrated in the FIGURES and described above are presently preferred, it should be understood that these embodiments are offered by way of example only. For example, other ways to determine the slope of a scanning electron microscope (SEM) signal may be employed. The invention is not limited to a particular embodiment, but extends to various modification, combinations, and permutations that nevertheless fall within the scope and spirit of the appended claims.

What is claimed is:

1. A method of measuring the critical dimension of an integrated circuit feature using a variable threshold process, the method comprising:

obtaining a first slope measurement of lateral side walls of an integrated circuit feature at best focus conditions;

obtaining a second slope measurement of lateral side walls of the integrated circuit feature at defocus conditions; and calculating a critical dimension of the integrated circuit feature from the first slope measurement and the second slope measurement.

2. The method of claim 1, further comprising providing a threshold value for a default.

3. The method of claim 1, wherein the critical dimension of the integrated circuit feature is below 0.16 µm.

4. The method of claim 1, wherein the integrated circuit feature is a contact hole.

5. The method of claim 1, wherein defocus conditions are ±0.3 µm from best focus.

6. The method of claim 1, wherein best focus conditions are dependent on the step and scanner exposure system.

7. A method of measuring the critical dimension of an integrated circuit feature using a variable threshold process, the method comprising:

obtaining a first slope measurement of lateral side walls of an integrated circuit feature at best focus conditions;

obtaining a second slope measurement of lateral side walls of the integrated circuit feature at defocus conditions; and calculating a critical dimension of the integrated circuit feature from the first slope measurement and the second slope measurement;

wherein the step of calculating a critical dimension of the integrated circuit feature comprises computing total critical dimension (CD) reduction from the equation:

$$\text{measured CD size} - 2X_1\left[\frac{\tan(90-\beta)}{\tan(90-\alpha)} - 1\right]$$

where $X_1$ is the increased dimension measurement at defocus conditions, α is the first slope measurement, and β is the second slope measurement.

8. A method of using a scanning electron microscope to measure a critical dimension of an integrated circuit feature, the method comprising:

determining a slope α of a contact hole at best focus conditions;

determining a slope β of the contact hole at defocus conditions, and using the slope α and the slope β, determining a critical dimension (CD) at a bottom of an integrated circuit feature.

9. The method of claim 8, wherein the step of determining a critical dimension (CD) comprises calculating a CD reduction amount from a scanning electron microscope CD measurement at defocus conditions.

10. The method of claim 8, further comprising receiving a threshold value.

11. The method of claim 8, wherein the step of determining a slope α of a contact hole at best focus conditions comprises calculating the slope using program software in a specialized machine.

12. The method of claim 8, wherein the step of determining a slope β of the contact hole at defocus conditions comprises calculating the slope using program software in a specialized machine.

13. The method of claim 8, wherein the slope α and the slope β are different from each other by a percentage of between 20 and 30.

14. A method of using a scanning electron microscope to measure a critical dimension of an integrated circuit feature, the method comprising:

determining a slope α of a contact hole at best focus conditions;

determining a slope β of the contact hole at defocus conditions; and using the slope α and the slope β, determining a critical dimension (CD) at a bottom of an integrated circuit feature;

wherein the critical dimension can be calculated from the equation:

$$2X_1\left[\frac{\tan(90-\beta)}{\tan(90-\alpha)}-1\right]$$

where $X_1$ is an increased dimension measurement at defocus conditions.

15. A variable threshold method of accurately determining a critical dimension (CD) of an integrated circuit feature, the method comprising:

applying a scanning electron microscope (SEM) to an aperture in a layer of material in a portion of an integrated circuit;

obtaining a first measurement of a critical dimension of the aperture;

applying the SEM again to the aperture;

obtaining a second measurement of the critical dimension of the aperture; and determining a depth of focus margin using the first measurement and the second measurement.

16. The method of claim 15, wherein the step of applying the SEM again to the aperture comprises applying the SEM at defocus conditions.

17. The method of claim 15, wherein the step of applying a SEM to an aperture in a layer of material in a portion of an integrated circuit comprises applying the SEM at best focus conditions.

18. The method of claim 15, wherein the aperture in the layer of material is a contact hole.

19. The method of claim 15, wherein the depth of focus margin is 0.6 μm.

20. The method of claim 15, wherein the critical dimension of the aperture is measured at the bottom of the aperture.

* * * * *